(12) United States Patent
Fei et al.

(10) Patent No.: US 11,580,415 B2
(45) Date of Patent: Feb. 14, 2023

(54) HIERARCHICAL MULTI-TASK TERM EMBEDDING LEARNING FOR SYNONYM PREDICTION

(71) Applicant: Baidu USA, LLC, Sunnyvale, CA (US)

(72) Inventors: Hongliang Fei, Sunnyvale, CA (US); Shulong Tan, Santa Clara, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 825 days.

(21) Appl. No.: 16/506,291

(22) Filed: Jul. 9, 2019

(65) Prior Publication Data
US 2021/0012215 A1 Jan. 14, 2021

(51) Int. Cl.
*G06F 17/00* (2019.01)
*G06N 5/02* (2023.01)
*G06N 7/00* (2023.01)
*G06F 40/247* (2020.01)

(52) U.S. Cl.
CPC ............. *G06N 5/02* (2013.01); *G06F 40/247* (2020.01); *G06N 7/005* (2013.01)

(58) Field of Classification Search
CPC ...... G06F 40/30; G06F 40/284; G06F 40/247; G06F 40/295; G06F 16/334; G06F 17/14
USPC .......................................................... 704/9
See application file for complete search history.

(56) References Cited

U.S. PATENT DOCUMENTS

| | | | | |
|---|---|---|---|---|
| 10,360,507 | B2* | 7/2019 | Aravamudan | G06F 40/30 |
| 2017/0083623 | A1* | 3/2017 | Habibian | G06F 16/334 |
| 2019/0080000 | A1* | 3/2019 | Munoz | G06F 17/11 |
| 2019/0354883 | A1* | 11/2019 | Aravamudan | G06F 40/30 |

OTHER PUBLICATIONS

"A+ Medical Encyclopedia," Online Medical Encyclopedia, [online], [Retrieved Sep. 3, 2020]. Retrieved from Internet <URL:http://www.a-hospital.com/> & Google Translation.(12pgs).

(Continued)

*Primary Examiner* — Md S Elahee
(74) *Attorney, Agent, or Firm* — North Weber & Baugh LLP

(57) ABSTRACT

Due to the high language use variability in real-life, manual construction of semantic resources to cover all synonyms is prohibitively expensive and may result in limited coverage. Described herein are systems and methods that automate the process of synonymy resource development, including both formal entities and noisy descriptions from end-users. Embodiments of a multi-task model with hierarchical task relationship are presented that learn more representative entity/term embeddings and apply them to synonym prediction. In model embodiments, a skip-gram word embedding model is extended by introducing an auxiliary task "neighboring word/term semantic type prediction" and hierarchically organize them based on the task complexity. In one or more embodiments, existing term-term synonymous knowledge is integrated into the word embedding learning framework. Embeddings trained from the multi-task model embodiments yield significant improvement for entity semantic relatedness evaluation, neighboring word/term semantic type prediction, and synonym prediction compared with baselines.

20 Claims, 7 Drawing Sheets

(56) References Cited

OTHER PUBLICATIONS

Cohen et al.,"A Comparison of String Distance Metrics for Name-matching Tasks," In Proc. of the 2003 Int'l Con. on Info. Integration on the Web (IIWB), 2003. (6pgs).
Collobert et al.,"Natural Language Processing (Almost) from Scratch," arXiv preprint arXiv:1103.0398, 2011. (47pgs).
Ester et al.,"A Density-Based Algorithm for Discovering Clusters in Large Spatial Databases with Noise,", In Proc. of the 2nd ACM Int'l Con. on Knowledge Discovery & Data Mining (SIGKDD), 226-231,1996. (6pgs).
Fage-Butler et al.,"Medical terminology in online patient-patient communication: evidence of high health literacy?," Health Expectations 19 (3): 643-653, 2016. (1pg).
Fan et al.,"LIBLINEAR: A Library for Large Linear Classification," Journal of Machine Learning Research 9, 1871-1874. 2008. (33 pgs).
Faruqui et al.,"Retrofitting Word Vectors to Semantic Lexicons," arXiv preprint arXiv:1411.4166, 2015. (10pgs).
Fei et al.,"Structured Feature Selection and Task Relationship Inference for Multi-task Learning," In Proc. of the 11th IEEE Int'l Con. on Data Mining (ICDM), 2011. (2pgs).
D. A. Ferrucci, "Introduction to "This is Watson"," IBM Journal of Research and Development 56, 3, 2012. (2pgs).
M. Hagiwara,"A Supervised Learning Approach to Automatic Synonym Identification Based on Distributional Features," In ACL Student Research Workshop, 2008. (6 pgs).
Hasan et al.,"Neural Clinical Paraphrase Generation with Attention," In Proc. of the Clinical Natural Language Processing Workshop, 2016. (12 pgs).
Hashimoto et al.,"A Joint Many-Task Model: Growing a Neural Network for Multiple NLP Tasks," arXiv preprint arXiv:1611.01587, 2017. (15pgs).
Henriksson et al.,"Synonym extraction and abbreviation expansion with ensembles of semantic spaces," Journal of Biomedical Semantics 5:6, 2014. (25pgs).
Leeuwenberg et al.,"A Minimally Supervised Approach for Synonym Extraction with Word Embeddings," Methods of Information in Medicine 105, 2016. (32pgs).
Li et al.,"Integration of Knowledge Graph Embedding into Topic Modeling with Hierarchical Dirichlet Process,", In Proc. of the Annual Con. of the North American Chapter of the Association for Computational Linguistics (NAACL-HLT), 2019. (11 pgs).
Li et al.,"TMSA: A Mutual Learning Model for Topic Discovery and Word Embedding," In Proc. of the SIAM Data Mining Conference (SDM), 2019. (9pgs).
Linderg et al.,"The Unified Medical Language System," The Prague Bulletin of Mathematical Linguistics 4,1993. (1pg).
Luaces et al.,"Binary relevance efficacy for multilabel classification," Progress in Artificial Intelligence, 1, 303-313, 2012. (11pgs).
Ma et al.,"Dipole: Diagnosis Prediction in Healthcare via Attention-based Bidirectional Recurrent Neural Networks," arXiv preprint arXiv:1706.05764, 2017. (10pgs).
Ma et al.,"End-to-end Sequence Labeling via Bidirectional LSTM-CNNs-CRF," arXiv preprint arXiv:1603.01354, 2016. (12pgs).
Meystre et al.,"Extracting information from textual documents in the electronic health record: a review of recent research," Yearbook of medical informatics, 2008. (17pgs).
Mikolov et al.,"Efficient Estimation of Word Representations in Vector Space," arXiv preprint arXiv:1301.3781, 2013. (12pgs).
Mikolov et al.,"Distributed Representations of Words and Phrases and Their Compositionality," arXiv preprint arXiv: 1210.4546, 2013. (9pgs).
Minkov et al.,"Learning Graph Walk Based Similarity Measures for Parsed Text," In Proc. of the Con. on Empirical Methods in Natural Language Processing (EMNLP), 2008. (10pgs).
Nguyen,"Modeling Skip-Grams for Event Detection with Convolutional Neural Networks," In Proc. of the Con. on Empirical Methods in Natural Language Processing , 2016. (6 pgs).
Petterson et al.,"Reverse Multi-Label Learning," In Advances in Neural Information Processing Systems (NIPS), 2010. ( 11pgs).
Qu et al.,"Automatic Synonym Discovery with Knowledge Bases," arXiv preprint arXiv:1706.08186, 2017. (9pgs).
Søgaard et al.,"Deep multi-task learning with low level tasks supervised at lower layers," In Proc of the 54th Annual Meeting of the ACL, 2016. (5pgs).
Thanda et al.,"Multi-task Learning Of Deep Neural Networks For Audio Visual Automatic Speech Recognition," arXiv preprint arXiv:1701.02477, 2017. (5pgs).
Van der Plas et al.,"Finding Synonyms Using Automatic Word Alignment and Measures of Distributional Similarity," In Proc of Association for Computational Linguistics, 2006.(8p).
Wang et al.,"Medical Synonym Extraction with Concept Space Models," arXiv preprint arXiv:1506.00528, 2015. (7pgs).
W. E. Winkler,"String Comparator Metrics and Enhanced Decision Rules in the Fellegi-Sunter Model of Record Linkage," In Proc of the Section on Survey Research Methods,1990.(7p).
Xu et al.,"RC-NET: A General Framework for Incorporating Knowledgeinto Word Representations," In Proc. of the 23rd Int'l Con on Information & Knowledge Management, 2014.(10pgs).
Yamada et al.,"Joint Learning of the Embedding of Words and Entities for Named Entity Disambiguation," arXiv preprint arXiv: 1601.01343, 2016. (10pgs).
Yang et al.,"NCRF++: An Open-source Neural Sequence Labeling Toolkit," arXiv preprint arXiv:1806.05626, 2018. (6pgs).
Yu et al.,"Improving Lexical Embeddings with Semantic Knowledge," In Proc of the 52nd Annual Meeting of the Association for Computational Linguistics (ACL), 2014. (6pgs).
Zhan et al.,"Inductive Semi-supervised Multi-Label Learning with Co-Training," In Proc of the 23rd ACM Int'l Con on Knowledge Discovery & Data Mining (SIGKDD), 2017. (10 pgs).
Zhang et al.,"On the Generative Discovery of Structured Medical Knowledge," In Pro. of the 24th ACM Int'l Con on Knowledge Discovery & Data Mining, 2018. (9pgs).
Zhou et al.,"Binary Linear Compression for Multi-label Classification," In Proc. of the Int'l Joint Con. on Artificial Intelligence (IJCAI), 2017. (7pgs).

\* cited by examiner

300

---

Pre-process a corpus of words to form an input corpus comprising terms, in which each multiple word phrase corresponding to a term in the vocabulary is converted into the term (e.g., the phrase "runny nose" is treated as a term "runny_nose") — *305*

↓

Convert the terms into term embeddings (e.g., inputting the term into an input layer to perform an embedding lookup) — *310*

↓

For each term, query the term against a knowledge base to determine the term's one or more semantic types, if any — *315*

↓

For each context window whose target term has at least one semantic type, input the target term's embedding and an indicator of the semantic type(s) of the neighboring terms in the context window into a multi-label classifier that outputs a probability distribution of predicted semantic types for the neighboring terms in the context window — *320*

↓

Use the known semantic types of the neighboring terms as ground truth relative to the probability distribution of predicted semantic types for the neighboring terms to train the term embedding parameters ($V$) and the semantic type prediction parameters ($U$) of the multi-label classifier — *325*

↓

For each target term, predict the neighboring terms for the target term using the target term's embedding, the probability distribution of predicted semantic types for the neighboring terms of the target term obtained from the multi-label classifier, and embedding of synonyms of the target term as inputs to a term classifier — *330*

↓

Use the known neighboring terms as ground truth relative to the neighboring terms predicted by the term classifier to train the term prediction layer parameters ($W$), the term embedding parameters ($V$), and the semantic type prediction parameters ($U$) — *335*

FIG. 3

HIERARCHICAL MULTI-TASK TERM EMBEDDING LEARNING FOR SYNONYM PREDICTION

BACKGROUND

A. Technical Field

The present disclosure relates generally to systems and methods for computer learning that can provide improved computer performance, features, and uses. More particularly, the present disclosure relates to embodiments for obtaining more representative term embeddings that leverage domain knowledge.

B. Background

Synonym prediction has become an important task for various applications, such as for entity-centric text mining and interpretation. With the aid of synonym prediction, informal mentions of an entity can be normalized into its standard form, which significantly reduces the communication gap between end-users and downstream applications. Such examples include but not limited to question & answering, information retrieval, and medical diagnosis.

From a resource perspective, a major difficulty in synonym prediction is high variability of language use but low coverage of knowledge base (KB), especially for certain languages. For example, in the Chinese medical domain, the concept "食欲不振 (translation: loss of appetite)" has more than 20 synonyms ("Loss of appetite" synonym examples in Chinese include: {胃口差, 吃不下东西, 胃口不好, 东西吃不下, 饭吃不下, 不爱吃饭} (translation: no desire for food); {食欲低下, 食欲下降, 食欲不太好, 缺乏食欲, 食欲差, 食欲减退} (translation: decreased appetite), but most of them are missing in existing medical knowledge bases because they are mainly used by patients without much medical knowledge. Although one can leverage state-of-the-art named entity recognition tools to discover more entities, little has been done to construct labeled data with annotations for informal descriptions and synonyms for training.

From the modeling perspective, a key question for synonym prediction is how to learn more effective representations for entities and descriptions. With a high-quality semantic representation, any off-the-shelf classifiers may be applied to predict synonymous relation. Recently, word and entity embedding methods, which learn distributed vector representation of words from a large corpus, have been prevalent in data mining communities. For English, a few word or character embedding based synonym prediction methods have been proposed.

For example, some attempted to integrate the semantic type knowledge of terms into word embedding learning and combined the learned embeddings with other syntactic features for synonym prediction. Although the model leveraged semantic type knowledge, it ignored the rich relational information among entities. Others used character embeddings as term features and cast the synonym prediction task as a neural machine translation problem, in which a target synonym was generated by a bi-directional RNN given the source term. At least one limitation of such a complex model is that it requires a large amount of labeled data from the Unified Medical Language System (UMLS), but there are no such public resources other languages, such as in Chinese.

Accordingly, what is needed are improved systems and methods for obtaining more representative term embeddings of terms (e.g., a word or a phrase).

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 graphically depicts an overview of a hierarchical multi-task term embedding model, according to embodiments of the present disclosure.

FIG. 3 depicts a methodology for using a hierarchical multi-task term embedding model, according to embodiments of the present disclosure.

DETAILED DESCRIPTION OF EMBODIMENTS

Figure 1:
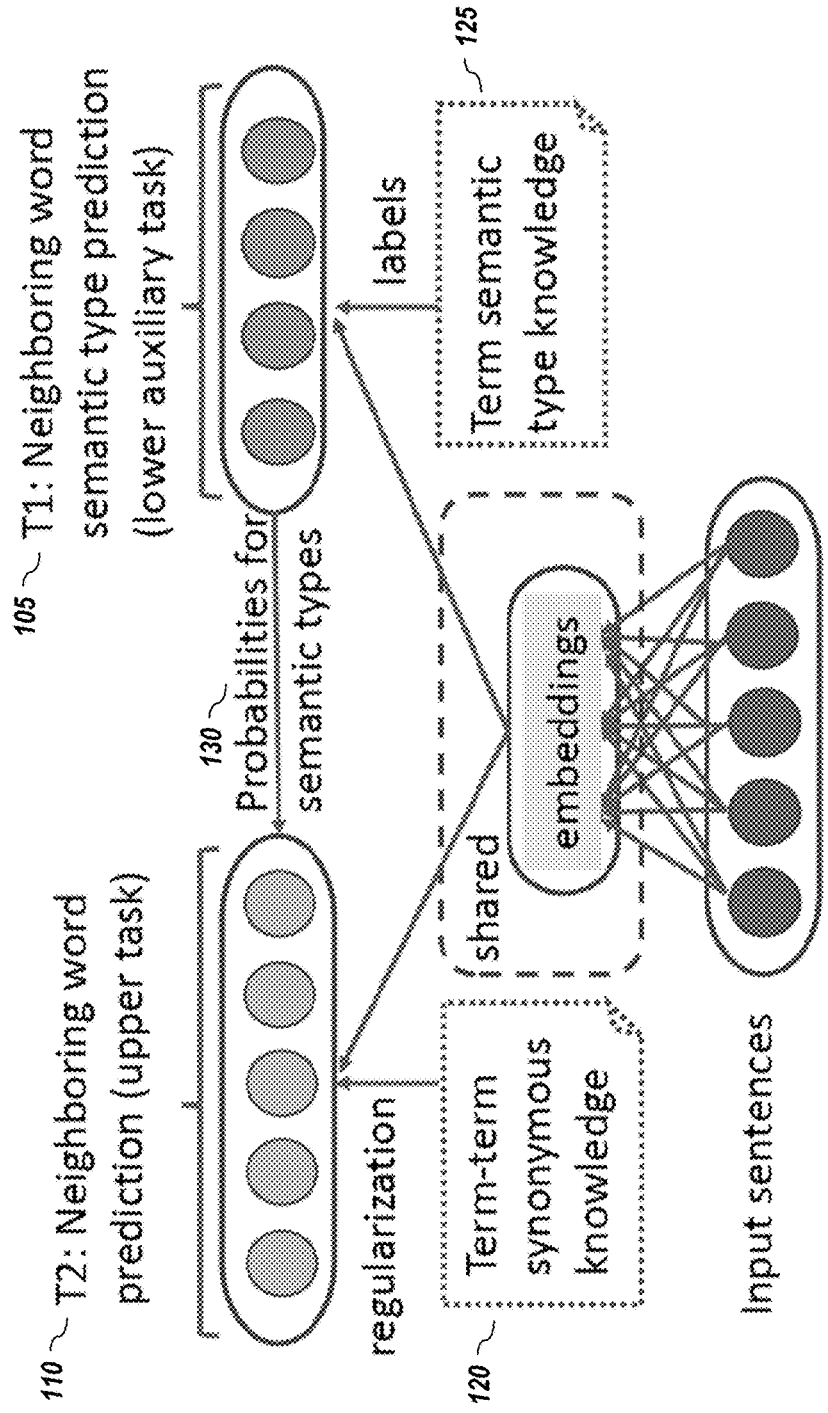

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "term" as used herein shall mean a word or a set of words that convey a concept; herein "word" may be used interchangeably with "term."

Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Introduction

Incorporating semantic knowledge should learn more representative word embeddings, and hence will lead to a more accurate synonym prediction. Herein semantic knowledge may be considered to include both entity's semantic type information and semantic relatedness information among entities.

Given the ability of predicting two increasingly complex but related tasks at successive layers, an embodiment of a hierarchical multi-task term embedding model 100 is shown in FIG. 1. At the lower layer, an auxiliary task 105 is introduced that predicts neighboring word semantic types given the target word and term semantic type knowledge 125. At the upper layer, a skip-gram model is extended to incorporate existing synonymy knowledge 120 among entities and the lower level task's outcomes 130. Such a hierarchical structure allows not only use of the entities' semantic types and semantic relation but mutually enhances the two tasks in the training stage.

Although embodiments presented here are described in the context of the medical domain in Chinese, which has very high language use variability, rich semantic knowledge, but low knowledge base coverage, the disclosed methodology embodiments are generic (i.e., the methodology may be applied to numerous subject matter domains). Thus, model embodiments of the present disclosure may also be applied to any other domains—especially where external knowledge is tremendous, and language use variability is very high. Experimental results show that model embodiments learn more representative embeddings and generate better accuracy for entity semantic relatedness evaluation, neighboring word semantic type prediction, and synonym prediction.

To summarize, contributions of embodiments of the present disclosure include at least the following:

Presented are hierarchical multi-task word embedding model embodiments that fully leverage domain knowledge, such as medical domain knowledge. By introducing an auxiliary task of neighboring word semantic type prediction, more information is provided to the word embedding objective. Embodiments of an alternative optimization algorithm were also designed the model embodiments and achieved better performance compared with existing methods.

A large Chinese medical corpus (around 10M sentences) was collected from professional medical textbooks, wikis, and forums with the purpose of identifying more informal medical descriptions and synonymous pairs. From the corpus, about 151K medical entities and descriptions covering 18 categories with 185K high-quality synonymous pairs were identified. The annotated dataset may be used to help researchers to discover more noisy and informal medical descriptions. To inventors' knowledge, this corpus is the first Chinese benchmark with both entities annotated and synonyms labeled.

One or more model embodiments were applied to 400M pairs of medical terms and obtained around 1M synonym candidates unseen in any previous medical resources. The newly discovered synonyms can enrich existing knowledge bases in Chinese.

B. Some Related Work

The importance of synonym extraction has been well recognized in the biomedical and clinical research community. Early approaches were typically non-neural based methods. Conventional techniques included the use of lexical and syntactic features, bilingual alignment-based methods, and random walk on a term graph.

For neural-based methods, word embedding techniques have been widely adopted for synonym prediction. Recently, there has been a growing interest to enhance word embedding by incorporating domain semantic knowledge. The enhancement typically either changes the objective of word embedding by adding relation regularization during the training phase or takes a post-processing step on the trained word vectors to accommodate the semantic relation. For either case, only the term-term relation is used, but semantic type information of terms is ignored. In Table 1, the characteristics of related methods and embodiments presented herein are summarized.

TABLE 1

Characteristics for each method.

| Method | ST | SR | PP | MT |
|---|---|---|---|---|
| Method embodiments herein | x | x | | x |
| Yu and Dredze [1] | | x | | |
| Wang et al. [2] | x | | | x |
| Faruqui et al. [3] | | x | x | |

ST means semantic type, SR means synonymous relation, PP means post-processing, and MT means multi-task. "x" indicates a method may include a certain property.

[1] Mo Yu and Mark Dredze. 2014. Improving Lexical Embeddings with Semantic Knowledge. In *Proceedings of* the *52nd Annual Meeting of the Association for Computational Linguistics (ACL)*. 545-550.

[2] Chang Wang, Liangliang Cao, and Bowen Zhou. 2015. Medical Synonym Extraction with Concept Space Models. In *Proceedings of the 24th International Conference on Artificial Intelligence (Proceedings of the International Joint Conference on Artificial Intelligence (IJCAI))*. 989-995.

[3] Manaal Faruqui, Jesse Dodge, Sujay K. Jauhar, Chris Dyer, Eduard Hovy, and Noah A. Smith. 2015. Retrofitting Word Vectors to Semantic Lexicons. In *Proceedings of the Annual Conference of the North American Chapter of the Association for Computational Linguistics (NAACL-HLT)*. 1606-1615.

Among all the embedding-based methods, the most similar works to some embodiments herein are Wang et al. and Yu and Dredze. In Wang et al., semantic types of terms were incorporated as extra-label information in the word embedding training process. Such a semi-supervised method enables word embedding model to consider the "desired type" when generating the "desired word," which is a special case of multi-task learning with two tasks on the same level. Model embodiments herein leverage not only the semantic type of terms but also the term-term synonymous relation. In Yu and Dredze, a relation constrained word embedding model is presented, in which the term-term synonymous relation is utilized by maximizing the log-likelihood of all synonymous pairs. Although in embodiments herein the synonymous relation among terms are also used, there are at least two major differences. The first difference is that the word embedding model embodiments of the present disclosure are a hierarchical multi-task learning framework with an auxiliary task of predicting semantic types of terms. The second difference is that a different regularization strategy is employed in embodiments herein to enforce the synonymous pairs to share similar embeddings instead of maximizing their log-likelihood.

Another line of related research is multi-task learning (MTL), which learns multiple related tasks simultaneously to improve generalization performance. MTL has been applied to a wide range of applications including healthcare informatics, speech recognition, and natural language processing. In particular, some have demonstrated the strength of positioning different tasks at different layers by considering the linguistic hierarchies. For example, some have built a many-task model in which tasks were incrementally growing according to their complexity (e.g., POS tagging→entity chunking→dependency parsing). One of the key differences between their work and embodiments herein is that the hierarchical multi-task model embodiments herein not only solves the two predictive tasks but also leverages two types of semantic knowledge.

C. Methodology Embodiments

In this section, a skip-gram model is first presented, then embodiments of a hierarchical multi-task word embedding model according to the present disclosure are presented. As a preliminary matter, notation used herein is presented in Table 2.

TABLE 2

Notation table.

| Notation | Meaning |
|---|---|
| n | number of words in the vocabulary |
| m | number of semantic types |
| d | word embedding dimension |

TABLE 2-continued

Notation table.

| Notation | Meaning |
|---|---|
| $x_i$ | ith input word |
| V | Word/Term embedding matrix of size n × d |
| U | Parameters for semantic type prediction layer with size m × d |
| W | Parameters for word prediction layer with size n × (d + m) |
| $\mathbb{C}$ | The set of all semantic types with size m |
| $\mathbb{X}$ | The vocabulary of size n |
| $c_i$ | The ith semantic type in $\mathbb{C}$ |
| $A_i$ | The ith row of matrix A |
| $\sigma(.)$ | Sigmoid function: $\sigma(x) = 1/(1 + \exp(-x))$ |
| $\|A\|_F$ | F-norm of matrix A |

1. Skip-Gram Embedding Model

A goal of a skip-gram model is to optimize word embeddings that are effective for predicting neighboring words given the target word. More formally, it minimizes the following objective function:

$$L_{sg} = \frac{1}{n}\sum_{t=1}^{n}\sum_{-c \leq j \leq c, j \neq 0} -\log p(x_{j+t} | x_t) \quad (1)$$

where $x_t$ is the target word, c is the context window size. The probability $p(x_O, x_I)$ is calculated using the softmax function:

$$p(x_O | x_I) = \frac{\exp(V_{x_I}^T W_{x_O})}{\sum_{x' \in \mathbb{X}} \exp(V_{x_I}^T W_{x'})} \quad (2)$$

A skip-gram model alternatively updates V and W and outputs the hidden representation V as final word embeddings, where the ith row of $V_i$ is the word $x_i$'s embedding vector.

2. Hierarchical Multi-Task Word Embedding Embodiments

In one or more embodiments, a skip-gram model is extended by introducing an auxiliary task of neighboring word semantic type prediction. One of the key insights is that knowing the semantic types of neighboring words will benefit neighboring word prediction. For example, in the medical domain, symptom terms are often surrounded by other symptom terms or disease terms. In one or more embodiments, each input sentence is or has been segmented into a sequence of terms (i.e., words/phrases), and medical entities are annotated. The advantage of the preprocessing is that embodiments can directly train embeddings for medical entities and descriptions like other ordinary words.

There are three ways to organize the two tasks:

(1) the two tasks are organized in parallel and share the common hidden embedding layer, which amounts to ordinary multitask learning with shared hidden layers in neural networks;

(2) the two tasks are hierarchically organized, wherein the neighboring word prediction task is positioned lower, and the neighboring word semantic type prediction task is placed upper; or (3) the hierarchical structure proposed herein—an embodiment of which is shown in FIG. 1. Such an approach enables the neighboring word prediction to leverage the outcomes of the neighboring word semantic type prediction and the shared word embeddings.

For at least some of the embodiments discussed herein, the last structure was selected for at least two reasons. First, predicting neighboring words is more complex than predicting their semantic types. The cardinality of the set of all possible neighboring words equals to the vocabulary size, which is much larger than that of semantic types. Second, from a linguistic perspective, knowing the possible semantic types will help neighboring word prediction task to focus on the words belonging to those types.

Figure 2:
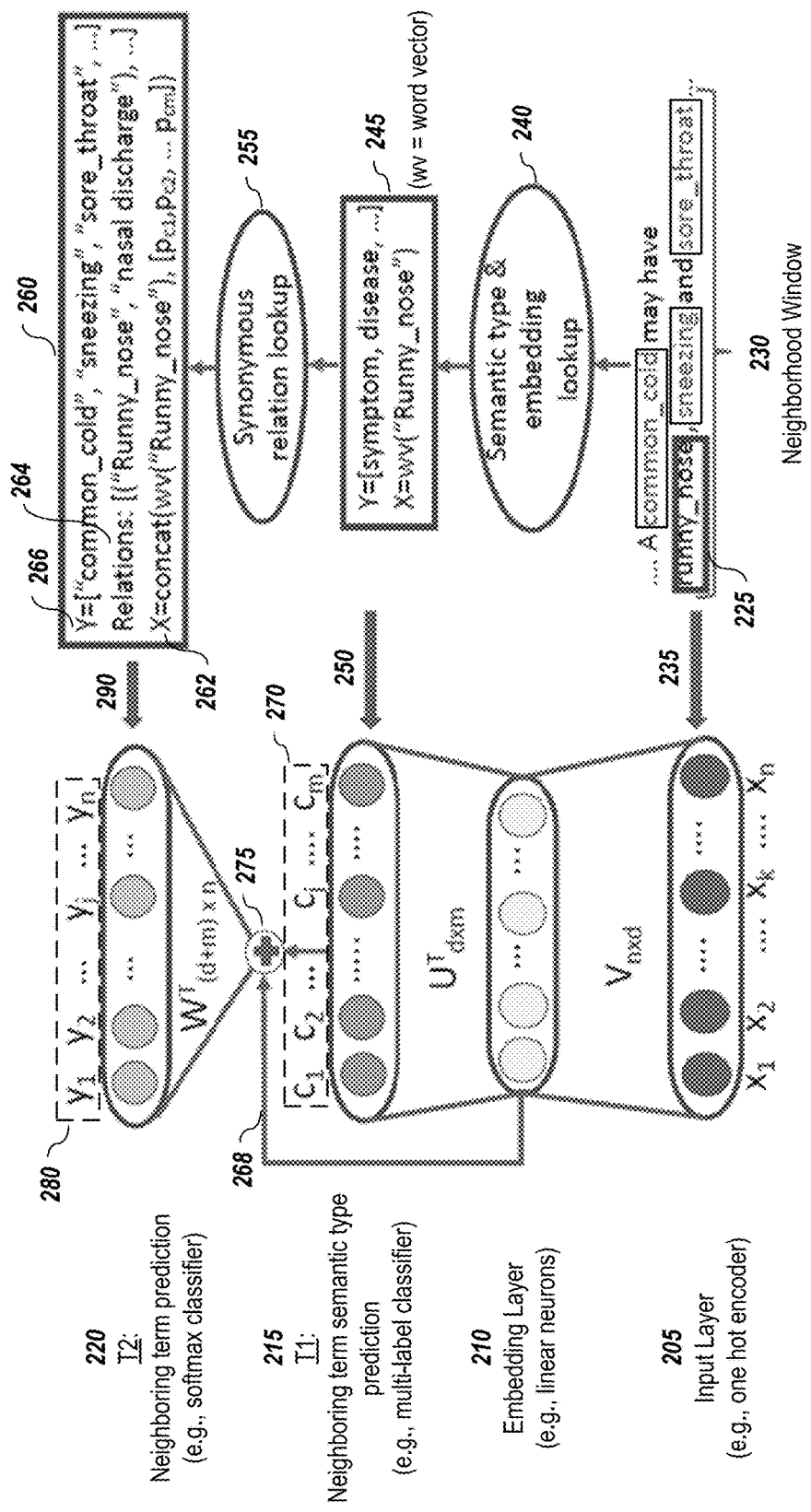
FIG. 2 graphically represents a hierarchical multi-task term embedding model architecture, according to embodiments of the present disclosure.

FIG. 2 graphically represents a hierarchical multi-task term embedding model architecture or framework, according to embodiments of the present disclosure. During training, a target term (e.g., runny_nose 225) and its neighboring terms (e.g., terms in neighborhood window 230) are fed (235) into an input layer 205 to perform embedding lookup 240. In one or more embodiments, the neighboring terms are also queried (240) against an external medical knowledge base (KB) to determine their corresponding semantic types (e.g., output set Y in box 245). The target term embedding together with its neighboring words' types (e.g., box 245) are the task T1's 215 training data. Note that, in one or more embodiments, only the neighboring words with valid semantic types (e.g., the terms in boxes—e.g., common_cold, sneezing, and sore_throat) are fed (250) into the T1 neighboring term semantic type prediction network 215.

As graphically depicted in FIG. 2, the input 260 for the T2 neighboring term prediction network 220 comprises a combination 262 of the probability distribution 270 of semantic types from the T1 network 215 and the target word's embedding together with the neighboring terms' embeddings 268. In one or more embodiments, the target term's synonyms 264 are fed 290 into T2 as external knowledge; as discussed below, the target term's synonyms are used to help the embeddings of the target term's synonyms and the embedding of the target term be similar.

FIG. 3 depicts a methodology overview for a hierarchical multi-task term embedding model, according to embodiments of the present disclosure. In one or more embodiments, a corpus of text/documents is pre-process (305) to form an input corpus comprising terms, in which each multiple word phrase corresponding to a term in the vocabulary for the model is converted into the term (e.g., the phrase "runny nose" is treated as a term "runny_nose"). Then, the terms are converted (310) into term embeddings. In one or more embodiments, the terms are converted (310) into term embeddings by inputting the terms into an input layer of the hierarchical multi-task term embedding model to perform an embedding lookup.

In one or more embodiments, the terms are queried (315) against a knowledge base to determine the terms' one or more semantic types, if a term has any. It should be noted that not all terms will have a semantic type, especially given a domain of interest. For example, terms like "a," "the," "have," and the like do not have semantic types for a medial domain.

Given the input corpus, in one or more embodiments, a context window may move through the corpus. For each context window whose target term has at least one semantic type, the target term's embedding and an indicator of the semantic type or types of the neighboring terms in the context window are input (320) into a multi-label classifier portion of the hierarchical multi-task term embedding model to output a probability distribution of predicted semantic types for the neighboring terms in the context window. For example, referring to FIG. 2, the word vector or term vector for the target term "runny_nose" and the semantic types of the neighboring terms (e.g., "common_cold" is a disease and "sneezing" and "sore_throat" are both symptoms) are used as inputs.

In one or more embodiments, the known semantic types of the neighboring terms also are used (325) as the ground truth relative to the outputted probability distribution of predicted semantic types for the neighboring terms to train (325) the term embedding parameters and the semantic type prediction parameters of the multi-label classifier.

In one or more embodiments, for each target term, the neighboring terms for the target term are predicted (330) using the target term's embedding, the probability distribution of predicted semantic types for the neighboring terms of the target term obtained from the multi-label classifier, and embedding of synonyms of the target term as inputs to a term classifier portion of the hierarchical multi-task term embedding model. The known neighboring terms are used (335) as ground truth relative to the neighboring terms predicted by the term classifier to train the term prediction parameters, the term embedding parameters, and the semantic type prediction parameters of the hierarchical multi-task term embedding model.

Alternatively, in one or more embodiments, a method for obtaining represented embeddings of terms may comprise the following steps. In one or more embodiments, responsive to a term from an input corpus having one or more semantic types as indicated in a semantic type knowledge dataset, the term may be associated with the one or more semantic types. For a context window of terms from the input corpus in which the context window comprises a target term and a set of neighboring terms, training pairs of terms may be formed in which each training pair comprises the target term and a neighboring term. In one or more embodiments, the training pairs may be considered as two sets: a first training pair set comprising training pairs that comprise terms that each are associated with one or more semantic types, and a second training pair set comprising training pairs in which at least one of the terms of the training pair is not associated with one or more semantic types.

In one or more embodiments, embedding representations of the first training pair set and the associated one or more semantic types may be input into a multi-label classifier that outputs a set of predicted semantic types for neighboring terms for the target terms; and embedding representations of the first and second training pair sets, the set of predicted semantic types for neighboring terms of the target terms from the multi-label classifier, and a set of synonym terms corresponding to each of the target terms may then be input into a neighboring term classifier to predict neighboring terms for the target terms.

As noted previously, a synonyms knowledge dataset comprising synonyms of terms, which is used to obtain the set of synonym terms, and a semantic type knowledge dataset comprising one or more semantic types for each term of a set of terms from a system vocabulary may both be collected or obtained as part of a pre-processing stage. Also, a part of a pre-processing stage, a text corpus may be processed to form the input corpus comprising terms in which each multiple word phrase that corresponds to a term in a system vocabulary is converted into the term corresponding to the term in the system vocabulary.

Additional details are provided in the following sections.

a) T1 Model Embodiments—Neighboring Term Semantic Type Prediction

Given an input word and its embedding vector, this task is to predict its neighboring words' possible semantic types within a context window or neighborhood window. For example, in FIG. 2, the input target term "runny_nose" 225 is surrounded by two symptom terms (i.e., "sneezing" and "sore_throat") and one disease term (i.e., "common_cold") within a context window 230 of size 7, although other context window sizes may be used. This model is expected to assign higher probabilities to the semantic types of symptom and disease.

In one or more embodiments, the task T1 is cast as a multi-label classification problem, in which the number of labels equals the number of semantic types. Although there are many complicated multi-label classification algorithms which may be used, in one or more embodiments, binary relevance is used, which amounts to independently training one binary classifier for each label. One of the reasons for using binary relevance is that it is not only computationally effective but can induce optimal models when the loss function is a macro-averaged measure. In one or more embodiments, the following regularized weighted cross entropy objective is minimized:

$$L_{T1} = \qquad (3)$$
$$-\frac{1}{n}\sum_{t=1}^{n}\sum_{j=1}^{|C|}\{w_j y_{tj}\log p(y_{tj}|x_t) + |(1-y_{tj}) \times (1 - \log p(y_{tj}|x_t))\} +$$
$$\lambda\|V - V_0\|_F^2$$

where $y_{t,j}=1$ when the input word $x_t$ has a neighboring term with type $c_j$ in the training set, and $y_{t,j}=1$ otherwise. In one or more embodiments, $w_j$ is the positive sample weight for class $c_j$ that may be set as the inverse of positive/negative samples ratio. The conditional probability $p(y_{t,j}|x_t)$ may be defined as $p(y_{t,j}|x_t)=\sigma(U_j^T V_{x_t})$. In one or more embodiments, $V_0$ is the word embedding after training the task T2 at the previous epoch and $\lambda$ is a regularization parameter. For simplicity, the bias term in Eq. (3) is omitted, although bias terms were used in embodiments in the experimental section (Section D).

The term $\|V-V_0\|_F^2$ in Eq. (3) is called a successive regularization term, which penalizes the deviation of the current embedding parameters and those learned from the other task. Such a regularization term helps prevent parameters from varying too much when switching tasks hence can stabilize the training process.

In one or more embodiments, it was assumed that each medical term has only one semantic type, which is valid in the medical domain as it is rare for a medical entity to have two or more semantic types. For example, "aspirin" is a drug entity, and it cannot have semantic types of disease. However, it shall be noted that when extending the task T1 to other areas where a term may have multiple semantic types, one may utilize context-aware models, such as contextual dependency networks.

b) T2 Model Embodiments—Neighboring Word Prediction

In one or more embodiments, the approach to neighboring term prediction task works on improving word embeddings using prior knowledge (e.g., paraphrase, synonyms) by modifying a word embedding objective with a regularization term that encourages semantically related words to share similar word embeddings. In one or more embodiments, the approach to the problem is viewed as a multi-task setting.

In one or more embodiments, the input to task T2 is augmented with outcomes from the semantic type prediction task T1 and also utilize the successive regularization term to encourage a certain level of consensus between parameters of the two tasks.

Let $\theta=[V, U]$ denote the model parameters associated with task T1. The objective of task T2 to be minimized is as follows:

$$L_{T2} = \qquad (4)$$
$$\frac{1}{n}\sum_{t=1}^{n}\left\{\sum_{-c\leq j\leq c, j\neq 0} -\log p(x_{j+t}|x_t, f_{T1}(x_t)) + \lambda_1 \sum_{x\in S(x_t)} \|V_x - V_{x_t}\|_2^2\right\} +$$
$$\lambda\|\theta - \theta_0\|_F^2$$

where $S(x_t)$ is the synonym/paraphrase set of $x_t$ from the external knowledge, $f_{T1}(x_t)$ is the neighborhood semantic type prediction result of $x_t$, $\lambda_1$ is the regularization parameter for synonym priors, $\theta_0$ are the task T1's parameters after training T1 at the current training epoch. In one or more embodiments, the second regularization term is enforcing the word embedding similarity between the target word $x_t$ and its known synonyms, while the third term is the successive regularization term to stabilize the training process.

Let $\phi_I=[V_{x_I}, f_{T1}(x_I)]$. The conditional probability of observing word $x_O$ given $x_I$ and $f_{T1}(x_I)$ may be defined as:

$$p(x_O|x_I, f_{T1}(x_I)) = \frac{\exp(\phi_I^T W_{x_O})}{\sum_{x'\in \mathcal{X}} \exp(\phi_I^T W_{x'})} \qquad (5)$$

One issue in Eq. (5) is the high complexity to compute the normalization factor as it involves summation over all terms in the vocabulary. To address the issue, in one or more embodiments. a negative sampling (NEG) is used to convert the original one-vs-all multi-class objective into a binary classification objective. With negative sampling, the negative logarithm of Eq. (5) may be rewritten as:

$$J(x_O, x_I) = -\log\sigma(\phi_I^T W_{x_O}) - \sum_{x_k \in \mathbb{P}_{neg}(x_O)} \log\sigma(-\phi_I^T W_{x_k}) \qquad (6)$$

where $\mathbb{P}_{neg}(x_j)$ is the set of negative samples for $x_j$. Plugging Eq. (6) into Eq. (4) yields a simplified objective of the task T2:

$$L_{T2} = \qquad (7)$$
$$\frac{1}{n}\sum_{t=1}^{n}\left\{\sum_{-c\leq j\leq c, j\neq 0} J(x_{j+t}, x_t) + \lambda_1 \sum_{x\in S(x_t)} \|V_x - V_{x_t}\|_2^2\right\} + \lambda\|\theta - \theta_0\|_F^2$$

3. Training Embodiments

In one or more embodiments, the model is trained over a large text corpus with an external knowledge base support, in which semantic types and term-term synonymous relation are available. In one or more embodiments, mini-batch stochastic gradient descent (SGD) with a schedule to decay the learning rate by half after certain global steps is used.

Figure 4:
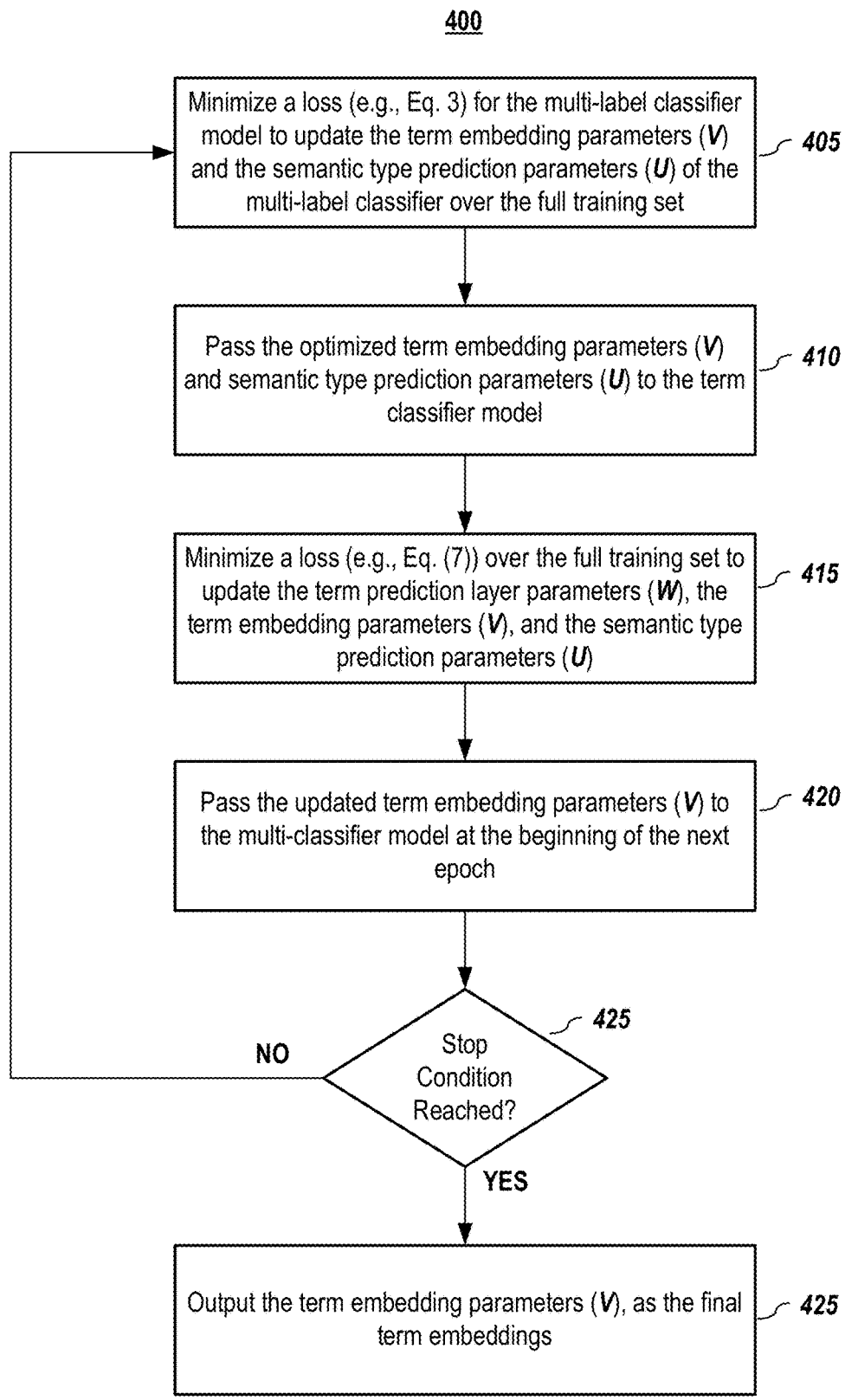
FIG. 4 depicts a method for training a hierarchical multi-task term embedding model, according to embodiments of the present disclosure.
Figure 5:
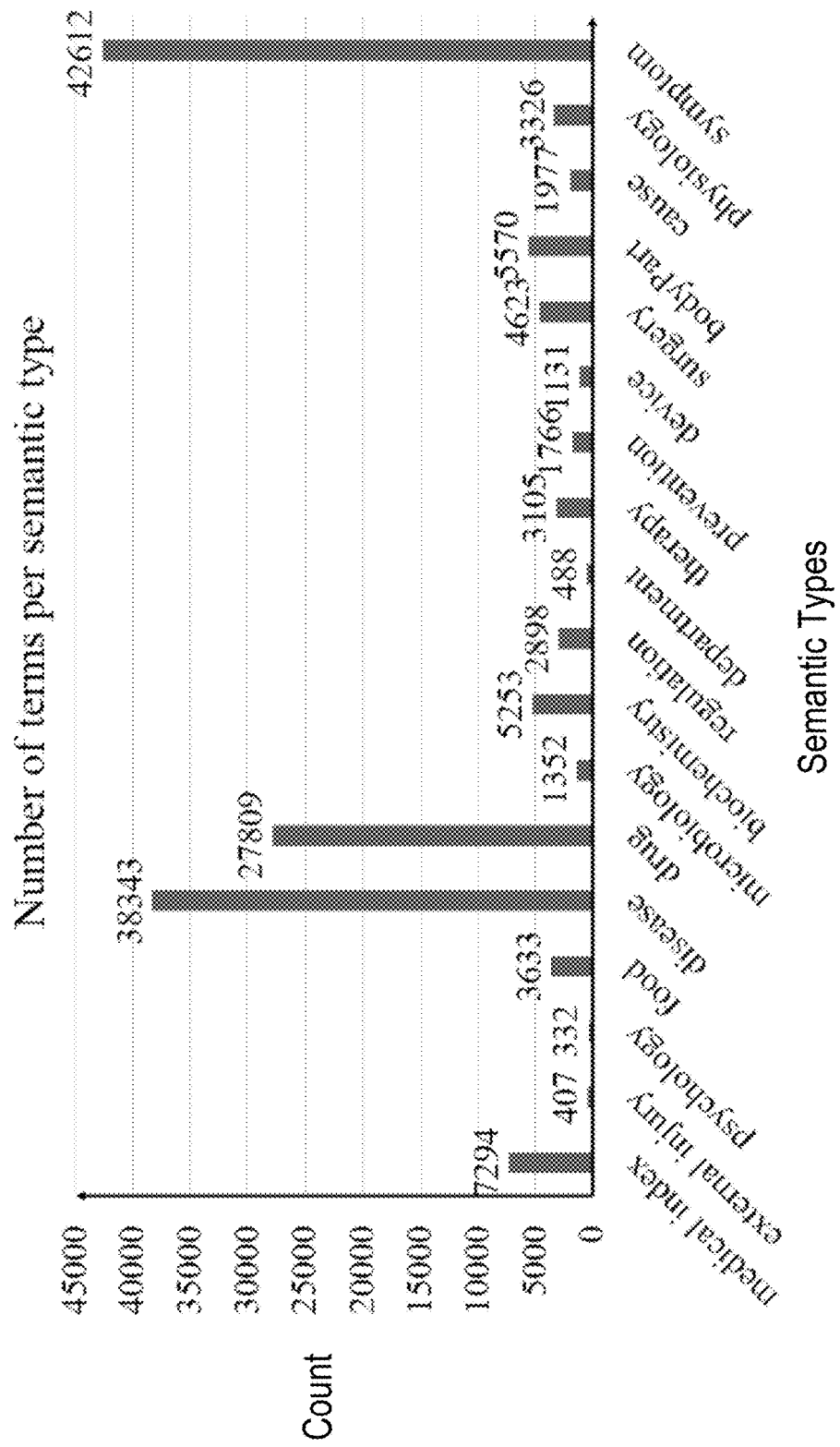
FIG. 5 depicts summary statistics of a medical dictionary, according to embodiments of the present disclosure.

FIG. 4 depicts a method for training a hierarchical multi-task term embedding model, according to embodiments of the present disclosure. During each epoch, the optimization iterates from the lower task (T1) to the higher task (T2) as described in FIG. 2. In one or more embodiments, $L_{T1}$ in Eq. (3) is minimized (405) to update V and U over the full training set, then the optimized V and U are passed (410) to the upper network. By minimizing $L_{T2}$ in Eq. (7) over the full training set, W, V, and U are updated (415), and V is passed (420) to the lower level task at the beginning of the next epoch. In one or more embodiments, the above process is iterated (425) until reaching a stopping condition (e.g., a predefined number of epochs), and V is output (430) as the final word embeddings.

In one or more embodiments, the reason of choosing V instead of W as the final embedding is that V is shared between the two tasks and is updated for both tasks, while W is only updated when training the neighboring term prediction task. Therefore, V carries more semantic information regarding the entity types. In one or more embodiments, W may be used as the final embedding.

4. Application to Synonym Prediction

Although synonymous relation is utilized during term embedding learning, the available synonyms may have a limited coverage. To extract more synonymous pairs, embodiments may train more complex models, or embodiments may use a simple model (e.g., linear support vector machine) but include more informative features. The latter embodiments are emphasized since a goal herein is to learn more representative embeddings.

To capture more useful information for synonym extraction, feature vectors for pairwise terms were constructed based on the trained term embeddings, including but not limited: 1) addition of two embedding vectors; 2) absolute difference between two embedding vectors; 3) elementwise multiplication of two embedding vectors; 4) elementwise division of two embedding vectors; 5) concatenation of two embedding vectors; and/or 6) max/average pooling of two embedding vectors. Furthermore, in one or more embodiments, two more features were added: 1) cosine similarity between a pair of term vectors, and 2) Jaro-Winkler similarity between two terms at string level, which achieved the best performance in entity name-matching tasks.

5. Implementation Embodiments

One skilled in the art shall recognize that embodiments of the present disclosure may be used for various useful purposes. Examples of potential implementations include but are not limited to the following: gauging entity semantic relatedness; predicting semantic types; and predicting synonym—although those skill in this art shall recognize other applications. In the following Experiments section, examples of these implementations are set forth and tested. Also, examples, such as generating new synonymous pairs in the medical domain, are also demonstrated below.

D. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

A Chinese medical corpus was collected from nine textbooks, medical wiki information, and medical QA forums. In total, the corpus contains around 10M sentences. The Unified Medical Language System (UMLS) entity type taxonomy was followed but low-level semantic types were merged to its upper-level concepts (e.g., detailed drug components to drugs) and several semantic types were renamed to make crowd-sourcing validation easier. In total, there are 18 types: symptom, disease, drug, food, therapy, surgery, prevention, medical device, department, cause, body part, external injury, biochemistry, examination and medical index, physiology, psychology, medical regulation, and microbiology.

1. Medical Entity and Synonym Collection

From the medical wiki website, 70K professional entities were collected. To identify informal medical terms, crowd sourcing was used to collect 30K informal medical descriptions. The well-known named entity recognition model "CNN-BiLSTM-CRF" was trained on 200K sentences, in which the initial 100K medical terms were annotated under the "BIOES" scheme, although it should be noted that other named entity recognition models may be used. Since there are 18 semantic types, there were 73 named-entity recognition (NER) tags in total. A 90.7% F1 score was obtained on another 20k labeled test sentences.

Figure 6:
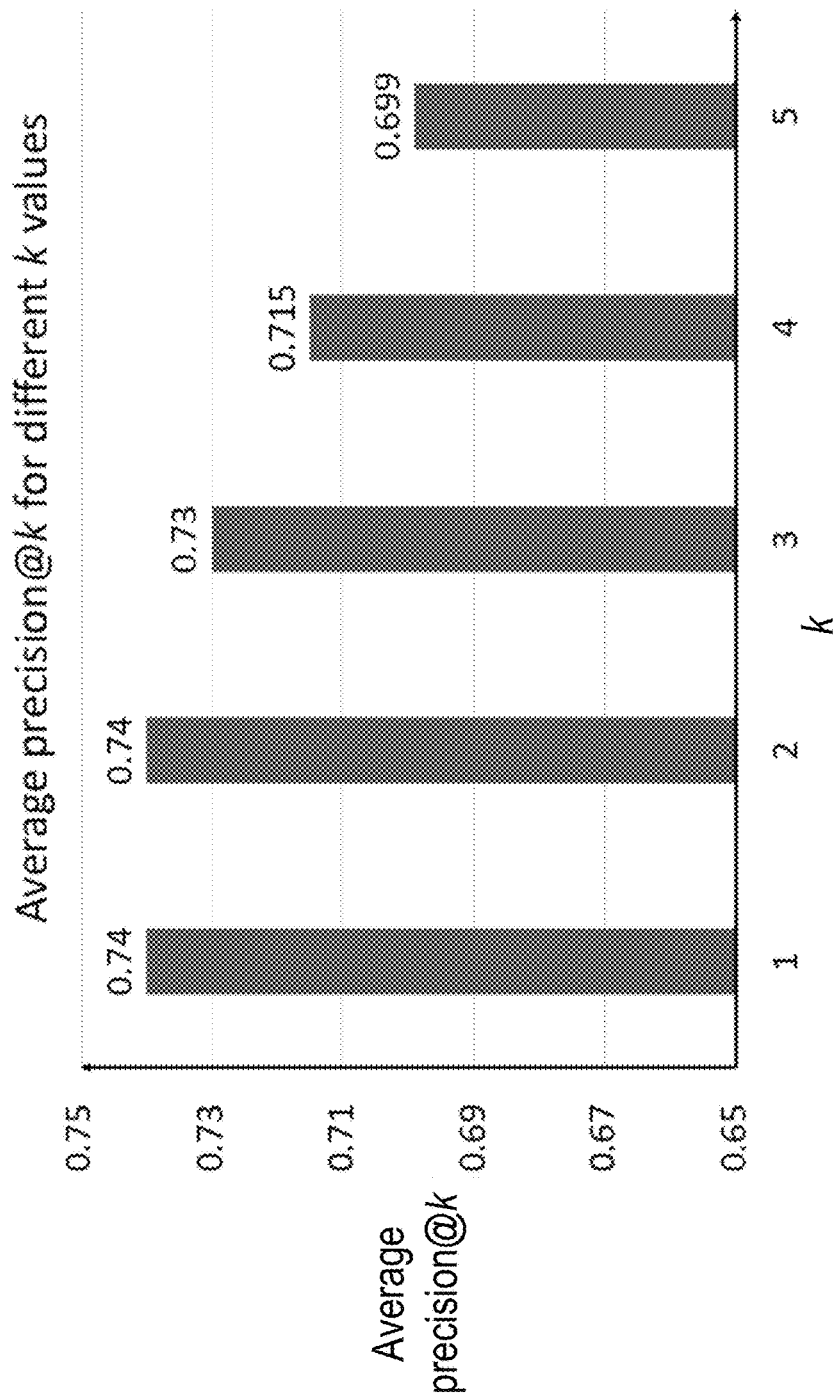
FIG. 6 depicts average precision@k results for 200 randomly sampled symptom terms, according to embodiments of the present disclosure.

With the trained NER model, 58K new entities and phrases were found from the large medical corpus with 10M sentences. After crowdsourcing validation, 51K were kept and combined with the initial 100K to build a medical dictionary of 151K entities belonging to 18 semantic types. Summary statistics of the medical dictionary used herein are provided in FIG. 6.

To collect initial synonymous pairs for word embedding and synonym model training, rules (e.g., A a.k.a. B) and regular expression were first used on the wiki text to identify the synonyms following certain patterns. Since rules have limited coverage, unsupervised methods were also used to collect more synonyms. In particular, the embeddings of 151K entities were trained on the text corpus using a word2vec model, then density-based spatial clustering (db-scan) was applied to find compact clusters. One reason of using dbscan is that it does not require to specify the number of clusters and can find clusters with any shapes. A smaller distance threshold of $\epsilon=2$ was set for two samples to be considered in the same neighborhood and minPoint=3 for the minimum number of samples for one sample to be a core point. A smaller distance threshold may help reduce false positives and achieve a higher precision.

After obtaining synonymous clusters (30K), crowd sourcing was used to guarantee that each cluster contains only high-quality synonyms. Annotators were divided into several groups, and two groups of people labeled the same batch of data. For disagreements, a third group was used to decide. The average annotator agreement was 0.80±0.09. In total, 185K synonymous pairs were obtained.

2. Experimental Data Preprocessing Embodiments

To prepare the training data for word embedding, jieba, a well-known Chinese word segmentation tool, which is available at github.com/fxsjy/jieba, was used and customized with the medical dictionary, to cut sentences in the medical text corpus into sequences of words and entities/phrases. Such a procedure helps ensure word embedding algorithms to treat medical terms as a whole and learn their representations. By filtering out rare words that appear less than five times and removing punctuation characters, 411,256 unique words and phrases were obtained. The segmented corpus was split into 3 parts: 80% training, 10% validation, and 10% testing for neighboring semantic type prediction experiments.

Among all the synonymous pairs, 25k pairs were sampled, containing 3586 unique entities for entity semantic relatedness evaluation in subsection D.4. The remaining 160k pairs were further split by 80%, 10%, and 10% for training, validation and testing for synonym prediction experiment in subsection D.6. The 80% split of synonymous pairs was also used as the term-term knowledge for word embedding training. In Table 3, characteristics of the datasets are summarized.

TABLE 3

Characteristics of the datasets.

| Dataset | Total | Train | Dev | Test |
|---|---|---|---|---|
| Medical corpus | 10M | 8M | 1M | 1M |
| Medical dictionary | 151M | — | — | — |
| Synonymous pairs | 160K | 128K | 16K | 16K |
| Semantic relatedness eval pairs | 25K | — | — | — |

"—" indicates no splitting. Semantic relatedness eval pairs data were sampled from the overall 185K synonymous pairs and not used in word embedding training.

3. Experiment Setup

The following values were set: word vector length d to 200, the initial learning rate to 0.001, the neighboring window size to 5, mini-batch size to 400, number of epochs to 20, and number of negative samples to 20.

To find the best hyper-parameters for the model discussed herein, a parameter search was performed on a combination of the successive regularization parameter $\lambda=\{0.1, 0.5, 1, 2, 8\}$ and synonym prior regularization $\lambda_1=\{0.01, 0.05, 0.1, 0.5, 1\}$, and the average pair-wise cosine similarity was computed on the synonymous pair dev data. It was found that the parameters did not significantly change the performance (1.0% at most). It was found that setting $\lambda=0.5$ and $\lambda_1=0.05$ yielded the best result.

To have a fair comparison, each method (embodiments disclosed herein and competing methods) on the 80% split of corpus data (8M sentences) and the term-term synonymous relation data. Also, each method shared the same setup for the word vector length, the mini-batch size, the number of negative samples, and the number of epochs.

An embodiment of the methodology herein was compared with several state-of-the-art word embedding approaches.

Mikolov et al. [Tomas Mikolov, Kai Chen, Greg Corrado, and Jeffrey Dean. 2013. Efficient Estimation of Word Representations in Vector Space. In *Proceedings of the International Conference on Learning Representations (ICLR)*. 1-12]. The gensim package (available at radimrehurek.com/gensim/models/word2vec.html) was used to train a skip-gram model with the same configuration as the tested method embodiment according to the current disclosure.

Yu and Dredze [cited above]. Word vectors were trained using their joint model training code (available at /github-.com/Gorov/JointRCM) using the same settings as above. The 80% split of "golden" synonyms were used as the paraphrase DB input. C is set by default.

Wang et al. [cited above]. The method only utilized semantic type information during training, and there are no other hyper-parameters to tune. Since there is no open source implementation for this method, it was carefully implemented in Tensorflow for comparison.

Faruqui et al. [cited above]. The "retrofitting" algorithm in this paper is a post-processing method to make word vectors more similar for synonym pairs. The source code (available at github.com/mfaruqui/retrofitting) was used, and it was applied to the word vectors from Mikolov et al. The semantic graph was constructed from the 80% split (128K) of the "gold" synonyms.

w2vRegSTL. A single-task embodiment of the methodology disclosed herein, which only keeps the neighboring word prediction task at the upper level, was also created.

4. Entity Semantic Relatedness Evaluation

This evaluation was to test the quality of learned word/phrase representations in a direct way without training any supervised models. Among all metrics, the cosine similarity between a pair of word vectors is commonly used to quantify how similar two words are. However, since each method learns word embeddings in different embedding space, directly comparing cosine values across all methods was inappropriate. Instead, the precision of its top k ranked entities were compared based on the cosine similarity for each entity.

In particular, given an entity for each method, the cosine similarity between the input entity and the rest entities in the semantic relatedness evaluation pairs data were computed, then they were sorted in descending order. Since the true synonyms within the evaluation data for the input are known, precision@k can be computed as precision@k=tp/k, where tp is the number of true synonyms in the input entity's top k ranked entities.

TABLE 4

Average precision@k for k = 1, 3, 5.

| | Precision @ k | | |
|---|---|---|---|
| Model | k = 1 | k = 3 | k = 5 |
| Our tested method embodiment | 0.654* | 0.603* | 0.571* |
| Mikolov et al. | 0.538 | 0.507 | 0.467 |
| Yu and Dredze | 0.619 | 0.572 | 0.547 |
| Wang et al. | 0.579 | 0.532 | 0.487 |
| Faruqui et al. | 0.588 | 0.558 | 0.513 |
| w2vRegSTL | 0.622 | 0.579 | 0.545 |

Bold font indicates the best performance.
Cells marked with * designates that the tested embodiment of the current disclosure significantly outperformed (p < 0.05) all the compared other methods.

In Table 4, the average precision@k was reported for the unique 3586 entities in the semantic relatedness evaluation data. From the table, it was observed that the original skip-gram model performs the worst, which is reasonable as it does not utilize any semantic knowledge. Although Wang et al. leverages the semantic type information, its performance is slightly better than Mikolov et al., but still inferior to those methods using synonymous relations. Faruqui et al., the post-processing method after embedding training, performs worse than Yu and Dredze and w2vRegSTL, which leverages the same term-term synonymy relations but uses them during training.

One possible reason is that Faruqui et al. only utilized the training synonym pairs, which may have little overlaps with the test synonym data. In that case, even though Faruqui et al. enforces smoothness of synonym pairs in the training data, it makes no difference for the terms in the leave-out data. To the contrary, Yu and Dredze, w2vRegSTL, and the tested embodiment of the current disclosure iteratively learn embeddings not only from synonymous relation but also from texts, which will allow the similarity to propagate between two isolated terms via some intermediate terms. Finally, the proposed multi-task methodology of the current disclosure outperformed all baselines with statistical significance under t-test ($p<0.05$), which demonstrates the benefit of utilizing both semantic type and synonymous knowledge and hierarchically arranging the two tasks.

5. Semantic Type Prediction Evaluation

Since the auxiliary task of "neighboring word semantic type prediction" was added to a skip-gram model, it is worthwhile to conduct a study on the effectiveness of the framework embodiments on this task.

For comparison, all the word vectors from competing methods were fixed and the same binary relevance model was trained as described in Eq. (3) except for replacing the successive regularization term with an L2 norm penalty on parameters U.

TABLE 5

AUC (Area Under ROC Curve) scores for "neighboring word semantic type prediction" task.

| Method | MacroAUC | MicroAUC |
|---|---|---|
| Our tested method embodiment | 79.92%* | 80.03%* |
| Mikolov et al. | 76.06% | 76.90% |
| Yu and Dredze | 76.21% | 76.71% |
| Wang et al. | 63.09% | 65.27% |
| Faruqui et al. | 76.27% | 76.84% |
| w2vRegSTL | 77.58% | 77.88% |

MacroAUC means macro-averaged AUC and MicroAUC means Micro-averaged AUC.

Table 5 shows the micro-average and macro-average AUC scores for the 18 semantic types. It was observed that Wang et al. performed much worse than any other methods. The rest baselines behave similarly to each other. Again, the tested method embodiment achieved the best result of around 80% AUC, which demonstrates the importance of jointly learning related tasks.

6. Synonym Prediction Evaluation

Since one of the focuses herein was to learn better medical entity/description representations for synonym prediction, a linear classifier was used rather than complicated ones to demonstrate the utility of learned embeddings. As discussed in subsection C.4, both expanded embedding features and syntax similarity features were extracted, leading to 1406 features in total for each pair of terms. To have a fair comparison, the same feature construction procedures were used, and the same classifier was run for all competing methods.

To construct negative samples, 1.4M pairs of medical terms were randomly sampled from our dictionary. Such a procedure may introduce false negatives, but the chance is low given a relatively large number of terms. The 1.4M negative samples were split by 80%, 10%, 10% as well and combined with the true synonymous pairs shown in Table 3 to make training, validation, and testing data. The $L_2$ regularized logistic regression in the LIBLINEAR package was used and the hyper-parameter in {0.01, 0.1, 0.5, 1, 4, 16, 64, 256} were tuned over the validation data on $F_1$ metric. The positive sample weight was set to 8.75 according to the inverse of positive and negative samples ratio in the training data (1.4M/160K).

TABLE 6

Precision, recall, and $F_1$ score of all methods on the test data.

| Method | Precision | Recall | $F_1$ score |
|---|---|---|---|
| Our tested method embodiment | 82.34%* | 93.07%* | 87.37%* |
| Mikolov et al. [23] | 75.39% | 85.53% | 80.14% |
| Yu and Dredze [37] | 80.23% | 92.03% | 85.73% |
| Wang et al. [32] | 81.36% | 85.86% | 83.55% |
| Faruqui et al. [7] | 80.09% | 88.08% | 83.89% |
| w2vRegSTL | 79.87% | 91.48% | 85.28% |

Cells marked with * designates that our method embodiment significantly outperforms (p < 0.05) all baselines.

Table 6 shows precision, recall, and $F_1$ score on the test data. It was observed that all methods have a relatively higher recall than precision, which is resulted from the positive class weight. Actually, in real-world applications, one can tune different sample weights and prediction threshold to tradeoff between precision and recall. The fact that Wang et al. obtained the second-best precision but has a lower recall reveals that the term-term synonymous relation is more important than the semantic type knowledge for synonym prediction task. Our tested method embodiment leverages both semantic type information and term-term synonymy knowledge and achieved the best performance on all the three metrics with statistical significance under proportion test (p-value<0.05).

To understand how much contribution each component of a full model embodiment makes to the synonym prediction, an ablation study was performed and the $F_1$ score is reported when each component was disabled, as illustrated in Table 7.

TABLE 7

Ablation study on synonym prediction task: $F_1$ score when each component was removed from the full model, while the rest components are unchanged.

| Model | $F_1$ score |
|---|---|
| Our full model embodiment | 87.37% |
| w/o the auxiliary task | 85.28% |
| w/o the synonymous regularization | 86.23% |
| w/o the pairwise lexical matching features | 86.93% |

Removing the auxiliary task of neighboring word semantic type prediction and synonymous regularization significantly deteriorated the tested full model embodiment's performance by 2.09% and 1.14%, respectively (significant statistical t-test with p<0.01). Such a huge performance drop demonstrates the importance of introducing the auxiliary task and incorporating synonymy knowledge. Furthermore, disabling the pairwise lexical matching features will slightly reduce the prediction performance, which is consistent with Wang et al.

7. Application to Unlabeled Symptom Pairs

In medical domain, the high language use variability usually originates from symptom terms since users have different expressions to describe the same concept. To generate more synonymous pairs, a trained synonym model embodiment (see, e.g., Section 6) was applied to 400M symptom pairs that never occur in our collected synonym data, and 1M new synonymous pairs were obtained. Although there is no way to thoroughly validate the accuracy of the newly generated pairs, a manual validation was performed by following a similar procedure for entity semantic relatedness evaluation.

First, 200 symptoms were randomly selected as queries and each symptom's top 5 most synonymous terms based on the probability score were collected, then each term was manually labeled whether it is a true synonym to the query entity and the metric of precision@k was computed. Finally, the average precision@k was calculated, and the results are reported in FIG. 6. Compared with Table 6, the precision is decreased. A possible reason is that only the symptom pairs that are very similar to each other from the unlabeled data were sampled, which is more challenging than random sampling regardless of semantic types. Nevertheless, the tested model embodiment still achieved 73% precision up to k=3.

8. Some Additional Alternative Embodiments

Carefully analyze of a few errors found during manual validation provided insights to additional embodiments to address various potential issues. While embodiments successfully link a semantically equal but lexically different descriptions, there are a few limitations that prevented the tested embodiment from working flawlessly:

Distinguishing the body parts that share very similar lexical patterns. To reduce such errors, a subject matching modular may be employed to detect if two phrases share the same subject before applying synonym predictive model.

Differentiating synonymy from semantic relatedness. Although word embedding has captured a certain level of semantic relatedness, it is not always reliable to tell the difference between synonymy and semantic relatedness, especially for pairs of terms that are both lexically and semantically related. For example, 胸部痛 (chest pain) and 胸部胀 (chest swelling) often co-occur with each other, and their embeddings are quite similar to each other, hence are predicted to be synonymous. To minimize such errors, more high-quality negative samples covering such cases may be used to guide classifiers to learn the subtle difference.

Sensing the position difference. For example, 肚脐周围疼痛 (pain around the navel area) and 肚脐右边疼 (navel pain on the right side) belong to the same concept of 肚脐疼 (navel pain) but have different locations. Strictly speaking, they may not be considered synonymous pairs. To alleviate such problems, more such negative samples may be used, and adverbs of location features may be extracted to learn the position difference.

E. Some Conclusions

Presented herein are embodiments of a hierarchical multi-task word embedding model to learn more representative entity embeddings and apply them to synonym prediction. Examples were provided in the medical domain. By introducing an auxiliary task of neighboring word semantic type prediction and fully utilizing medical domain knowledge, embodiments of the model yield more semantically meaningful word/term representations as evaluated by entity semantic relatedness, neighboring word/term semantic type prediction, and synonym prediction. Although examples presented herein were in the medical domain, embodiment of the model may be applied to other domains, particularly where external knowledge is large, and language use variability is very high. Furthermore, a large medical text corpus in Chinese that includes annotations for entities, descriptions and synonymous pairs was also created. It shall be noted that embodiments may be applied to medical domains in other languages. It shall also be noted that embodiment may also be employed in an end-to-end framework to integrate word/term representation learning and synonym prediction.

F. Computing System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
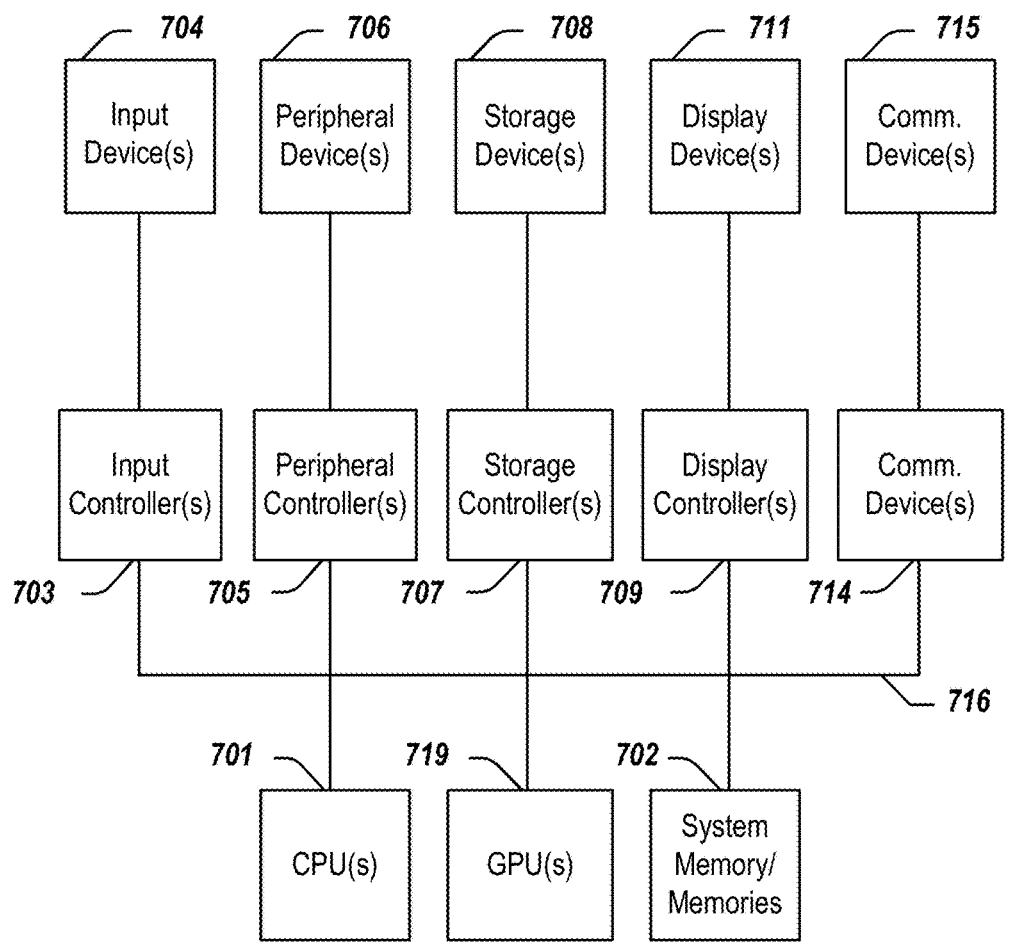
FIG. 7 depicts a simplified block diagram of a computing device/information handling system, in accordance with embodiments of the present disclosure.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implement method comprising:
  for each term of a set of terms selected from an input corpus, querying the term against a term semantic type knowledge base to determine the term's one or more semantic types, if any;
  converting at least some of the terms of the input corpus into term embeddings;
  for each context window, which comprises a target term and neighboring terms in the context window, whose target term has at least one semantic type, inputting the target term's embedding and an indicator of the semantic type or types of the neighboring terms in the context window into a multi-label classifier that outputs a probability distribution of predicted semantic types for the neighboring terms in the context window;
  using the semantic type or types of the neighboring terms as ground truth relative to the probability distribution of predicted semantic types for the neighboring terms to train a term embedding parameters set and a semantic type prediction parameters set of the multi-label classifier;
  for each target term, predicting the neighboring terms for the target term using the target term's embedding, the probability distribution of predicted semantic types for the neighboring terms of the target term obtained from the multi-label classifier, and embedding of synonyms of the target term as inputs to a neighboring term classifier; and using the neighboring terms as ground truth relative to the neighboring terms predicted by the neighboring term classifier to train a term prediction parameters set, the term embedding parameters set, and the semantic type prediction parameters set.

2. The computer-implement method of claim 1 further comprising:

pre-processing a corpus of words to form the input corpus comprising terms, in which each multiple word phrase corresponding to a term in a vocabulary is converted into the term in the vocabulary.

3. The computer-implement method of claim 1 wherein the step of converting at least some of the terms of the input corpus into term embeddings comprises:

inputting the at least some of the terms into an input layer of the multi-label classifier to perform embedding lookup.

4. The computer-implement method of claim 1 further comprising:

minimizing a loss for the multi-label classifier to update the term embedding parameters set and the semantic type prediction parameters set of the multi-label classifier over a full training set from the input corpus;

passing the term embedding parameters set and the semantic type prediction parameters set that have been updated to the neighboring term classifier;

minimizing a loss for the neighboring term classifier over the full training set to update the term prediction parameters set, the term embedding parameters set, and the semantic type prediction parameters set;

passing the term embedding parameters that was updated as part of the step of minimizing the loss for the neighboring term classifier to the multi-label classifier at the beginning of a next epoch;

responsive to a stop condition not being reached, repeating the above steps; and responsive to a stop condition being reached, output the term embedding parameters set of a last iteration as a final term embedding parameters set.

5. The computer-implement method of claim 4 wherein the step of minimizing a loss for the neighboring term classifier further comprises:

using a regularization that includes the embeddings of synonyms of the target term as a constraint.

6. The computer-implement method of claim 4 wherein the step of minimizing a loss for the neighboring term classifier further comprises:

using negative sampling to convert a one-versus-all multi-class objective into a binary classification objective.

7. The computer-implement method of claim 4 wherein the step of minimizing a loss for the neighboring term classifier further comprises:

using a successive regularization term to penalize deviation between the term embedding parameters set obtained from a prior iteration training of the neighboring term classifier and the term embedding parameters set of a current iteration training of the multi-label classifier.

8. A computer-implement method for obtaining represented embeddings of terms comprising:

responsive to a term from an input corpus having one or more semantic types as indicated in a semantic type knowledge dataset, associating the term with the one or more semantic types;

for a context window of terms from the input corpus in which the context window comprises a target term and a set of neighboring terms, forming training pairs of terms in which each training pair comprises the target term and a neighboring term;

dividing the training pairs into a first training pair set comprising training pairs that comprise terms that each are associated with one or more semantic types and a second training pair set comprising training pairs in which at least one of the terms of the training pair is not associated with one or more semantic types;

inputting embedding representations of the first training pair set and the associated one or more semantic types into a multi-label classifier that outputs a set of predicted semantic types for neighboring terms for the target term; and inputting embedding representations of the first and second training pair sets, the set of predicted semantic types for neighboring terms of the target term from the multi-label classifier, and a set of synonym terms corresponding to the target term into a neighboring term classifier to predict neighboring terms for the target term.

9. The computer-implement method of claim 8 further comprising the steps of:

collecting a synonyms knowledge dataset comprising synonyms of terms, which is used to obtain the set of synonym terms; and collecting the semantic type knowledge dataset comprising one or more semantic types for each term of a set of terms from a system vocabulary.

10. The computer-implement method of claim 8 further comprising the steps of:

given a corpus, pre-processing the corpus to form an input corpus comprising terms in which each multiple word phrase that corresponds to a term in a system vocabulary is converted into the term corresponding to the term in the system vocabulary.

11. The computer-implement method of claim 8 wherein the multi-label classifier and the neighboring term classifier share at least an embedding layer comprising embedding parameters.

12. The computer-implement method of claim 11 wherein:

the step of inputting embedding representations of the first training pair set and the associated one or more semantic types into a multi-label classifier that outputs a set of predicted semantic types for neighboring terms for the target term further comprises:

using the associated one or more semantic types as ground truth relative to the set of predicted semantic types to train the multi-label classifier comprising the embedding parameters; and the step of inputting embedding representations of the first and second training pair sets, the set of predicted semantic types for neighboring terms of the target term from the multi-label classifier, and a set of synonym terms corresponding to the target term into a neighboring term classifier to predict neighboring terms for the target term further comprises:

using the neighboring terms for the target term as ground truth relative to the predicted neighboring terms obtained from the neighboring term classifier to train the neighboring term classifier comprising the embedding parameters.

13. The computer-implement method of claim 12 further comprising:
    outputting embedding parameters after completing training.

14. A non-transitory computer-readable medium or media comprising one or more sequences of instructions which, when executed by one or more processors, causes steps to be performed comprising:
    for each term of a set of terms selected from an input corpus, querying the term against a term semantic type knowledge base to determine the term's one or more semantic types, if any;
    converting at least some of the terms of the input corpus into term embeddings;
    for each context window, which comprises a target term and neighboring terms in the context window, whose target term has at least one semantic type, inputting the target term's embedding and an indicator of the semantic type or types of the neighboring terms in the context window into a multi-label classifier that outputs a probability distribution of predicted semantic types for the neighboring terms in the context window;
    using the semantic type or types of the neighboring terms as ground truth relative to the probability distribution of predicted semantic types for the neighboring terms to train a term embedding parameters set and a semantic type prediction parameters set of the multi-label classifier;
    for each target term, predicting the neighboring terms for the target term using the target term's embedding, the probability distribution of predicted semantic types for the neighboring terms of the target term obtained from the multi-label classifier, and embedding of synonyms of the target term as inputs to a neighboring term classifier; and
    using the neighboring terms as ground truth relative to the neighboring terms predicted by the neighboring term classifier to train a term prediction parameters set, the term embedding parameters set, and the semantic type prediction parameters set.

15. The non-transitory computer-readable medium or media of claim 14 further comprising one or more sequences of instructions which, when executed by at least one of the one or more processors, causes steps to be performed comprising:
    pre-processing a corpus of words to form the input corpus comprising terms, in which each multiple word phrase corresponding to a term in a vocabulary is converted into the term in the vocabulary.

16. The non-transitory computer-readable medium or media of claim 14 wherein the step of converting at least some of the terms of the input corpus into term embeddings comprises:
    inputting the at least some of the terms into an input layer of the multi-label classifier to perform embedding lookup.

17. The non-transitory computer-readable medium or media of claim 14 further comprising one or more sequences of instructions which, when executed by at least one of the one or more processors, causes steps to be performed comprising:
    minimizing a loss for the multi-label classifier to update the term embedding parameters set and the semantic type prediction parameters set of the multi- label classifier over a full training set from the input corpus;
    passing the term embedding parameters set and the semantic type prediction parameters set that have been updated to the neighboring term classifier;
    minimizing a loss for the neighboring term classifier over the full training set to update the term prediction parameters set, the term embedding parameters set, and the semantic type prediction parameters set;
    passing the term embedding parameters that was updated as part of the step of minimizing the loss for the neighboring term classifier to the multi-label classifier at the beginning of a next epoch;
    responsive to a stop condition not being reached, repeating the above steps; and
    responsive to a stop condition being reached, output the term embedding parameters set of a last iteration as a final term embedding parameters set.

18. The non-transitory computer-readable medium or media of claim 17 wherein the step of minimizing a loss for the neighboring term classifier further comprises:
    using a regularization that includes the embeddings of synonyms of the target term as a constraint.

19. The non-transitory computer-readable medium or media of claim 17 wherein the step of minimizing a loss for the neighboring term classifier further comprises:
    using negative sampling to convert a one-versus-all multi-class objective into a binary classification objective.

20. The non-transitory computer-readable medium or media of claim 17 wherein the step of minimizing a loss for the neighboring term classifier further comprises:
    using a successive regularization term to penalize deviation between the term embedding parameters set obtained from a prior iteration training of the neighboring term classifier and the term embedding parameters set of a current iteration training of the multi-label classifier.

* * * * *